Dec. 26, 1939.                D. BONETTI                2,185,013
                             DECOY DEVICE
                          Filed Aug. 11, 1939
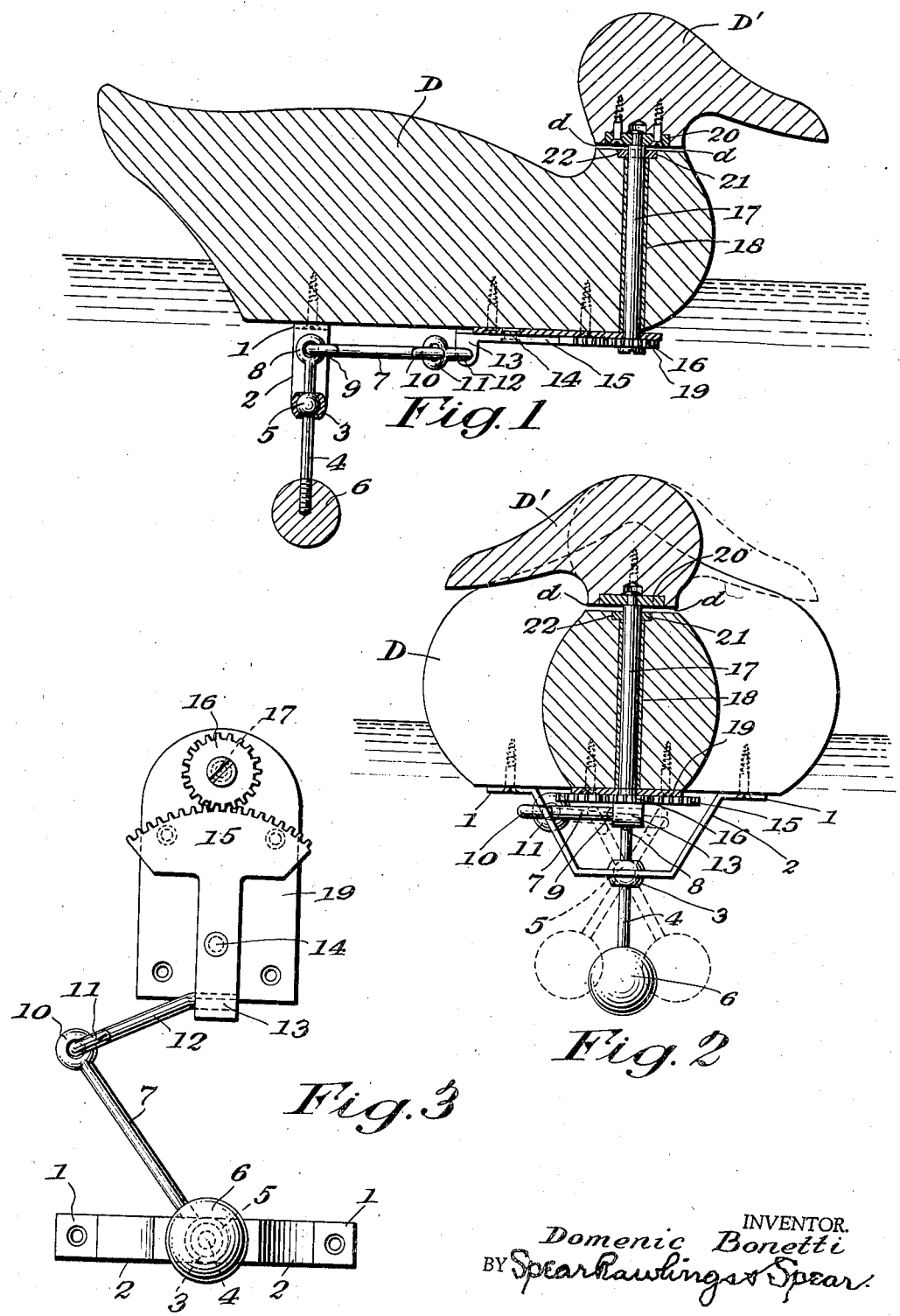
INVENTOR.
Domenic Bonetti
BY Spear Rawlings & Spear
ATTORNEYS.

Patented Dec. 26, 1939

2,185,013

UNITED STATES PATENT OFFICE 2,185,013

DECOY DEVICE

Domenic Bonetti, Portland, Maine

Application August 11, 1939, Serial No. 289,610

4 Claims. (Cl. 43—3)

In the hunting of certain game birds, such as duck, geese or other flight swimmers, much difficulty has been experienced as laws have become more stringent for their protection.

Certain States have laws prohibiting the use of live decoys and with the increase in the numbers of shooters as the sport's popularity increased, there has been a marked wariness of the flying birds to come over or down or if they do alight on the water they show reluctance to come in within range from blind, sink or float.

From my observations of these birds during the hunting season, or as a matter of interest as an admirer during closed season, I have learned some of their vital behavior characteristics. I have also studied the "behaviorism" of the inanimate bird or decoy and from the two sets of observations have visualized the difference between the two.

My concept is that of a buoyant decoy having certain potential simulative characteristics as in resting, feeding or swimming, either alone or in the flock, so that its appeal to the living bird which it simulates is increased in a marked degree, or I might say, in a way not wholly to be expected either mechanically or from the psychology of the living bird.

This is partly a matter of simulative posture on the part of the inanimate decoy, partly a matter of movement, and partly a matter of combined natural gestures, difficult to describe but easily observed in action.

Such I will attempt to point out in connection with my description of the mechanics of the matter. As illustrative I have shown certain characteristic forms and parts and suggested installation.

In the drawing, in which like reference characters are employed to indicate corresponding parts:

Fig. 1 is a longitudinal sectional view of a decoy according to my invention.

Fig. 2 is a cross section through the neck and suggesting movements and forces, and Fig. 3 is a bottom plan view of the head turning devices detached.

Referring to the drawing I have indicated at D a decoy which may be of any type but preferably is a simple one of solid wood, such as hunters usually have in considerable numbers for anchoring in front of a blind, sink or float. The head D' of such a decoy may be severed as by a simple saw cut at approximately the line d.

While my invention contemplates the production of completed decoys, it also provides for a simple mechanism which may be supplied to the sportsman who can thus convert his old solid block decoys into lifelike head turning simulations of ducks, geese and other flight birds. My discussion is to be understood as covering both the completed combination or the mechanism as an attachment to be embodied in decoys of various kinds as will be apparent to those skilled in this art and its practices.

In Figs. 1 and 2 I have indicated simple forms of mechanism according to my invention applied to the bottom side of the decoy so as to be wholly concealed by it.

In practice I provide a plate 1 having a bracket 2 formed with a shallow hollow or spheric bearing 3 which freely supports the pendulum rod 4 through a ball 5 which is attached to the rod 4 preferably about midway of its ends so as to form with the bearing 3 a universal joint. At its lower end the rod 4 carries a weight 6. This is preferably a lead sphere which acts as a pendulum for receiving the forces developed by the riding of the decoy on waves in any direction.

These movements it transmits to a link 7 extending forwardly of the rod 4 and freely connected to an eye 8 at its upper end by an eye 9 formed in the end of the rod which constitutes the link and freely engaging the eye 8 at the upper end of the pendulum arm 4.

At its forward end the rod of the link 7 is provided with another eye 10 forming a free joint with the eye 11 of a short lateral offset arm 12 on the lever 13 pivoted at 14 of a quadrant 15.

The teeth of the quadrant 15 mesh with a small gear 16 on the end of an upright shaft 17 rotatably supported in the sleeve 18 carried by a base plate 19 attached to the forward or head end of the decoy D.

The severed head D' is fitted at the base of the neck with an inset wear plate 20 through which the threaded end of the preferably square end head shaft is screwed to give it a free permanent mounting on the neck kerf d which I counterbore as at 21 to receive a fixed collar 22 resting on the upper end of the sleeve 18. This gives a free turning bearing between the plate 20 and the upper face of the fixed collar 22 so that each slight movement of the pendulum 6 is transmitted to the head to turn it more or less in either direction according to the initial direction of movement of the heavy lead sphere 6 in planes other than perpendicular to the link 7.

In practice, the decoys are anchored to give a concealed attachment and yield a maximum of lifelike appearance. By positioning the bracket to the rear of the decoy body, the parts being proportioned and adjusted, the body D will float in a natural swimming posture when anchored as indicated. This permits it to swing freely to point into the wind and so be exposed to cross waves or ripples as the wind shifts or changes direction.

The structure indicated is very simple but is found to be wonderfully effective in picking up the riding movements with varied rollings in any direction and convert them into head turning movements with a great appearance of naturalness so necessary to deceive the keen observation of fliers or swimmers, so that they will come close within range.

As indicated, my devices can be applied to ordinary wood or block decoys by simply attaching the parts in proper position on the bottom of the body. This is usually flat so that it is only necessary to screw them in place as by ordinary wood screws.

When an old decoy has been decapitated to provide a new mounting of the head, this is readily accomplished by boring a suitable hole in the vertical neck axis to receive the sleeve and its attachments. The fore and aft distribution of weight permits the decoy to float with its water line disposed as intended in the original design.

I am aware that it has been proposed to provide a hollow decoy with a counterweighted head, but such would not provide for the natural appearance of the bird in resting or swimming about to feed. My concept of the illusion is a slow turning of the head in one direction or another which imparts an appearance of life to ordinary block or like decoys and attracts the wild birds coming over and lighting nearby.

Decoys according to my invention may be set or anchored according to the individual preferences or prejudices but with reasonable setting and wind and tide conditions the hunter may be assured of an interesting inanimate performance and a reasonable bag.

What I therefore claim and desire to secure by Letters Patent is:

1. In a head turning device for a buoyant decoy for ducks or like flight fowl having a body member and a transversely severed neck, an attachment for the bottom of the body member including a bracket having a hollow spheric seat, a rigid arm, a spheric stop on said arm, a weight below said stop and supported by said stop below the center of gravity of the decoy, a neck stem, means for rotatably supporting said neck stem in the forward part of a decoy including bearing plates for the neck, a lever, means for rotatably transmitting the movements of said lever to said stem, and a link connecting said weight arm to said transverse lever arm by universally adjusting joints, whereby movement of said weight in planes other than perpendicular to said link transmits a turning motion to the decoy head.

2. In a head turning device for a buoyant decoy for ducks or like flight fowl having a body member and a transversely severed neck, an attachment for the bottom of the body member including a bracket having a hollow spheric seat, a rigid arm, a spheric stop on the arm, a weight below said stop and supported by said stop below the center of gravity of the decoy, a neck stem, a tubular bearing for vertically supporting said stem in the forward part of a decoy including bearing plates for the neck, a lever, and a link connecting said weight arm to said transverse lever arm by universally adjusting joints, whereby movement of said weight in planes other than perpendicular to said link transmits a turning motion to the decoy head.

3. In a head turning device for a buoyant decoy for ducks or like flight fowl having a body member and a transversely severed neck, an attachment for the bottom of the body member including a bracket having a hollow spheric seat, a rigid arm, a spheric stop on said arm, a weight below said stop and supported by said stop below the center of gravity of the decoy, a neck stem, means for rotatably supporting said neck stem in the forward part of a decoy including bearing plates for the neck, a lever having a transverse arm, means for rotatably transmitting the movements of said lever to said stem, and a link connecting said weight arm to said transverse lever arm by universally adjusting joints, whereby movement of said weight in planes other than perpendicular to said link transmits a turning motion to the decoy head.

4. In a head turning device for a buoyant decoy for ducks or like flight fowl having a body member and a transversely severed neck, an attachment for the bottom of the body member including a bracket having a hollow spheric seat, a rigid arm, a spheric stop on said arm, a weight below said stop and supported by said stop below the center of gravity of the decoy, a neck stem, means for rotatably supporting said neck stem in the forward part of a decoy including bearing plates for the neck, a lever having a transverse arm of bell crank type, and means for rotatably transmitting the movements of said lever to said stem, a segment and pinion, and a link connecting said weight arm to said transverse lever arm by universally adjusting joints, whereby movement of said weight in planes other than perpendicular to said link transmits a turning motion to a decoy head.

DOMENIC BONETTI.